United States Patent [19]

Symonds

[11] Patent Number: 5,437,336
[45] Date of Patent: Aug. 1, 1995

[54] METHOD AND APPARATUS FOR CREATING AN ADVANTAGEOUS GROWING ZONE IN A SOILBED HAVING A TOPSOIL STRATUM AND A HARDPAN STRATUM

[76] Inventor: Darrell C. Symonds, 1009 Woodland Dr., Pooler, Ga. 31322

[21] Appl. No.: 47,419

[22] Filed: Apr. 19, 1993

[51] Int. Cl.⁶ .............................................. A01B 5/00
[52] U.S. Cl. ................................. 172/176; 172/196; 172/574; 172/699
[58] Field of Search ............... 172/156, 175, 176, 177, 172/196, 382, 574, 604, 699, 700, 811

[56] References Cited

U.S. PATENT DOCUMENTS

| | | | |
|---|---|---|---|
| 1,785,676 | 12/1930 | DeYone | 172/175 X |
| 2,329,794 | 9/1943 | Speck | 172/177 |
| 2,646,738 | 7/1953 | Denning | 172/175 |
| 2,677,339 | 5/1954 | Armstrong et al. | 172/156 X |
| 3,268,012 | 8/1966 | Ratkowski | 172/700 |
| 3,601,202 | 8/1971 | Steffe | 172/574 X |
| 3,867,987 | 2/1975 | Seaberg | 172/811 X |
| 4,213,408 | 7/1980 | West et al. | 172/196 X |
| 4,245,706 | 1/1981 | Dietrich | 172/196 X |
| 4,625,809 | 12/1986 | Moynihan | 172/196 X |
| 4,819,737 | 4/1989 | Frase | 172/156 |
| 4,867,247 | 9/1989 | Heckendorf | 172/573 |
| 4,974,681 | 12/1990 | Symonds | 172/699 X |
| 5,259,460 | 11/1993 | Evers | 172/574 X |

Primary Examiner—Dennis L. Taylor
Assistant Examiner—John A. Ricci
Attorney, Agent, or Firm—Cushman Darby & Cushman

[57] ABSTRACT

A soilbed having a topsoil stratum and a subsurface hardpan stratum is fractured by a subsoiling tine to form a trench-like path which extends in depth at least partially into the hardpan stratum. One or more pairs of rotatable blades are operated thereafter which lift up, invert, and mound nutrient-rich topsoil from the topsoil stratum on either side of the trench-like path into the trench-like path. The mounded topsoil provides an unusually hospitable environment for plant growth, especially for the root systems of plants. Additional features, such as blade attachments, coulter disks, and a bulldozer blade may be provided to enable efficient operation with consistently beneficial results.

33 Claims, 4 Drawing Sheets

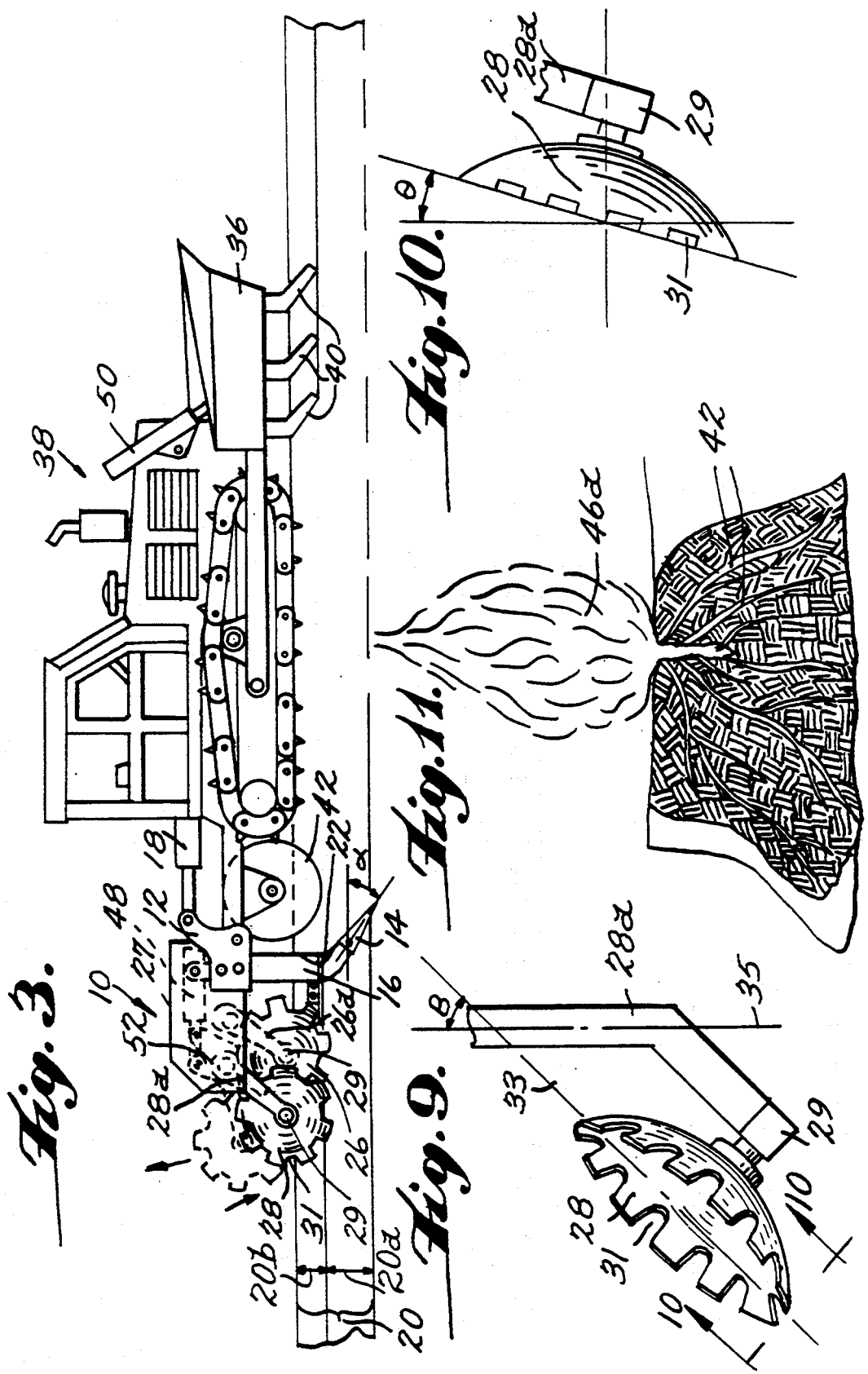

Fig. 5.
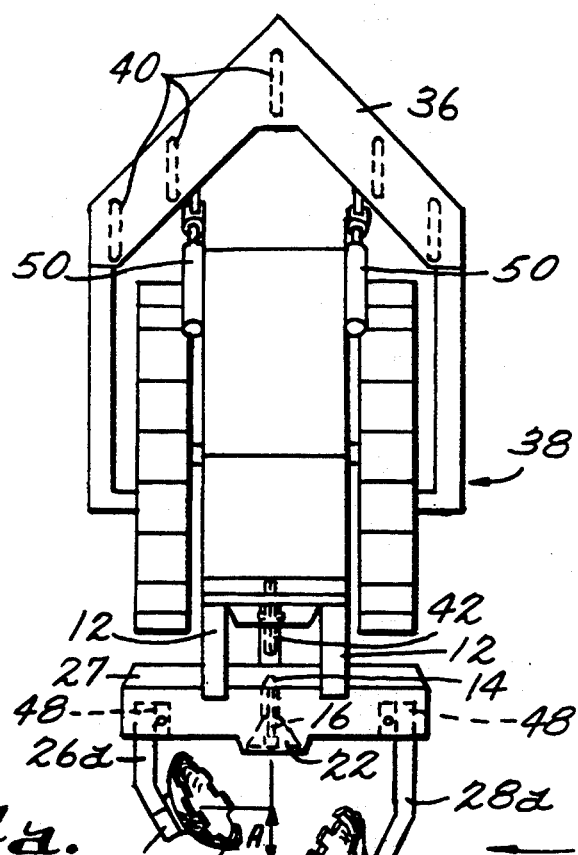
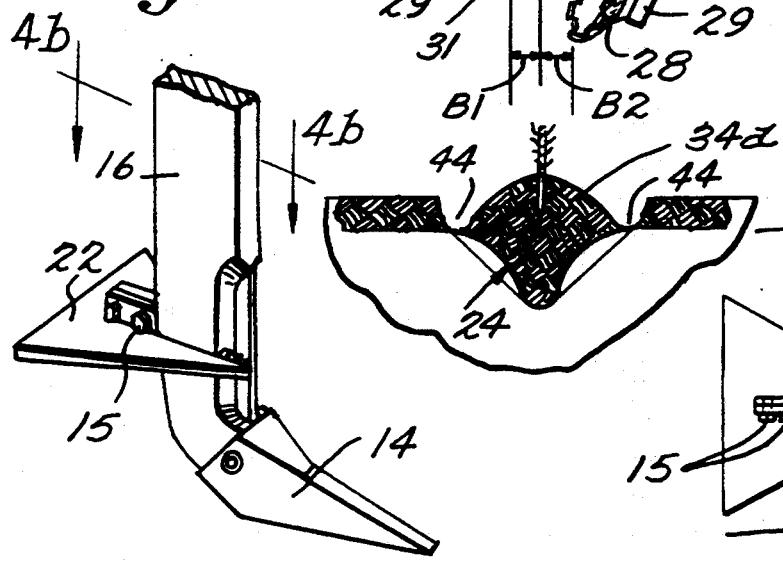
Fig. 6.
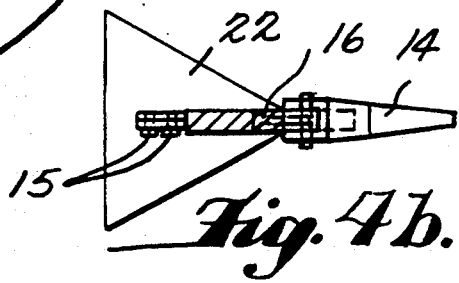
Fig. 4b.

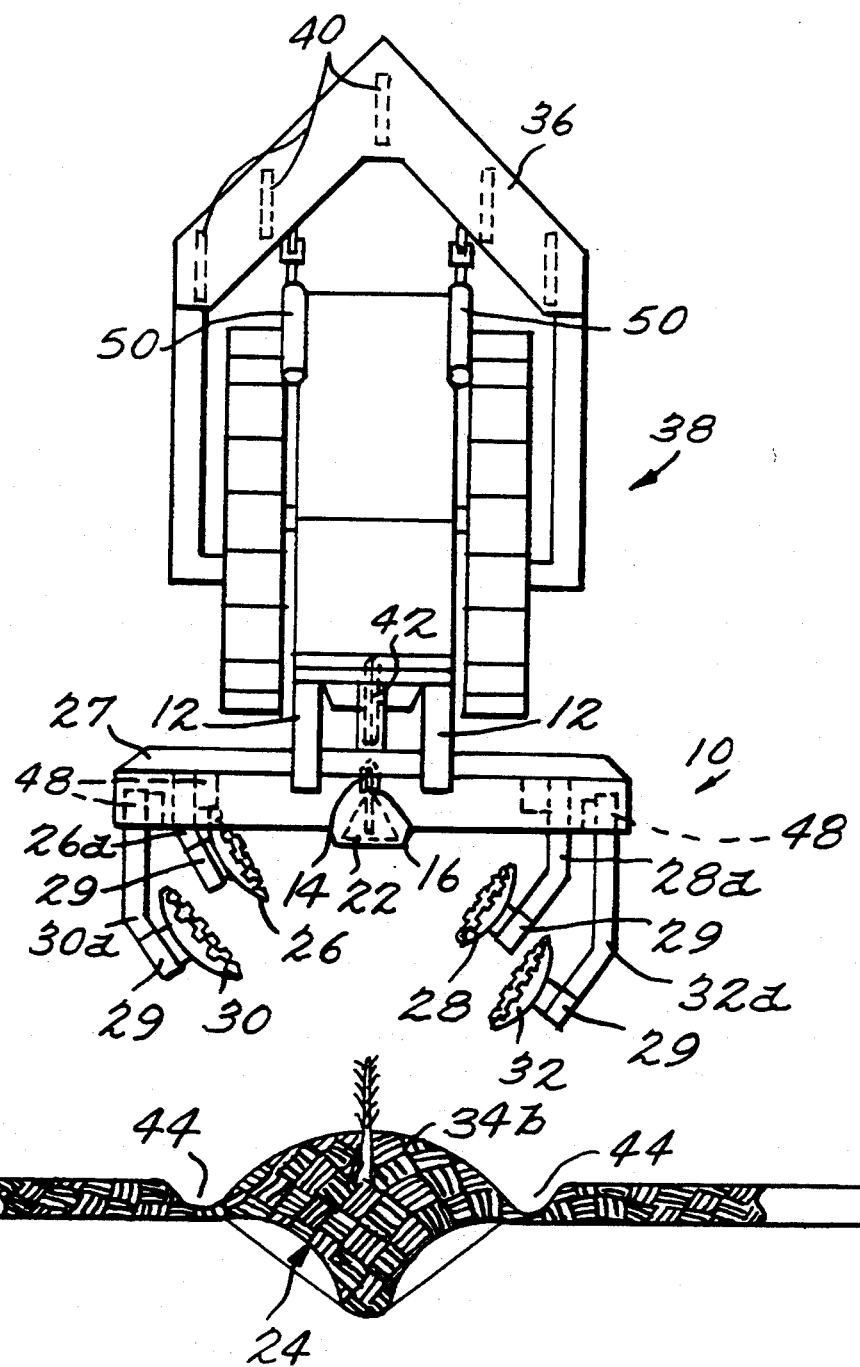

METHOD AND APPARATUS FOR CREATING AN ADVANTAGEOUS GROWING ZONE IN A SOILBED HAVING A TOPSOIL STRATUM AND A HARDPAN STRATUM

FIELD OF THE INVENTION

This invention relates to a soil cultivating method and apparatus for creating an advantageous growing zone in a soilbed, particularly in a soilbed having a nutrient-rich topsoil stratum which lies above a subsurface hardpan stratum.

BACKGROUND OF THE INVENTION

In certain regions of the world, a subsurface hardpan stratum lies below an upper stratum of soil in which plants are planted. This hardpan stratum is generally recognized as being severely deleterious to the growing potential of plants. In particular, the hardpan can form a barrier to the growth of a plant's root system beyond the topsoil stratum.

It is known to break up the hardpan stratum by using a pointed tine which is dragged or otherwise pulled therethrough. Applicant's previously issued U.S. Pat. Nos. 4,815,545 and 4,974,681 are directed to an apparatus and method, respectively, for fracturing the hardpan stratum, and are incorporated herein by reference.

FIGS. 1 and 2 generally illustrate the apparatus disclosed in Applicant's above-identified patents.

A frame 1 is coupled to a main frame 2, which is, in turn, supported by ground engaging wheels 3. The relative height of the wheels 3 is controlled by a hydraulic ram 4 operating through pivotally supported frame 5 on which wheels 3 are mounted.

The main frame 2 supports a blade plow 6 and a cutting coulter disk 9. A tine 8 is provided behind the blade plow 6. The tine 8 is rotatable about a vertical pivot axis at 7, best seen in FIG. 2.

While the above-described apparatus is generally effective for breaking up the hardpan stratum, it has been discovered that it is difficult to achieve consistent results with respect to the depth of hardpan fracture and the straightness of the fracture line. Further, breaking up the hardpan stratum is sometimes, but not always, sufficient to establish a desirable planting and growing zone. Also, the width of the fracture zone created by the apparatus is limited, thereby necessitating multiple passes to achieve a desired width of hardpan fracture.

In addition to the fact that the hardpan stratum has a deleterious effect on plant growth, it is also known that there is an uppermost stratum in soil (i.e., "topsoil") which typically contains the highest concentration of plant nutrients and is generally the most ideal soil medium for plant growth.

SUMMARY OF THE INVENTION

It is therefore an object of the present invention to provide an apparatus for creating an advantageous planting and growing zone in soil.

It is a second object of the present invention to provide a beneficial method for creating an advantageous plant growing zone in soil.

It is a third object of the present invention to provide a soilbed having advantageous and beneficial plant growth-supporting characteristics.

These and other advantageous objects are realized by providing an apparatus which operates to initially break up the subsurface hardpan stratum and create a trench-like path therethrough while also breaking up, moving and mounding the nutrient-rich topsoil in that trench-like path. This creates a well-defined zone comprised primarily of nutrient-rich, mounded topsoil which provides a particularly hospitable and long-term environment for plant growth and development.

In addition, the present invention encompasses a method for creating an advantageous plant growing zone, including fracturing the subsurface hardpan stratum, which inherently forms a trench-like path, followed by loosening, moving and mounding nutrient-rich topsoil from the topsoil stratum in and over the trench-like path such that the mounded topsoil is generally at least as high as the trench-like path is deep.

Further, a soilbed is provided in soil having a subsurface hardpan stratum and a topsoil stratum which includes a region of fractured soil. This region is characterized by a trench-like path therethrough which extends downwards in the soil through the topsoil stratum and at least partially into the hardpan stratum. Additionally, nutrient-rich topsoil is mounded in and along the trench-like path.

Other objects, features and characteristics of the present invention, as well as the methods of operation and functions of the related elements of the structure, and the combination of parts and economies of manufacture, will become more apparent upon consideration of the following detailed description and the appended claims, with reference to the accompanying figures all of which form a part of this specification, wherein like reference numerals designate corresponding parts in the various figures.

BRIEF DESCRIPTION OF THE DRAWINGS

FIG. 3 is a schematic side elevational view, illustrating the apparatus of the present invention;

FIG. 4a is an enlarged, partial perspective view illustrating a subsoiling tine and a blade attachment according to the present invention;

FIG. 4b is a top, partial cross-sectional view of the subsoiling tine and blade attachment, taken along line 4b—4b in FIG. 4a;

FIG. 5 is a schematic top plan view of the apparatus according to a first embodiment of the present invention;

FIG. 6 is a diagrammatic elevational and cross-sectional view of a soilbed prepared by the embodiment shown in FIG. 5;

FIG. 7 is a schematic top plan view of a second embodiment of the present invention;

FIG. 8 is a diagrammatic elevational and cross-sectional view of a soilbed prepared by the embodiment shown in FIG. 7;

FIG. 9 is an enlarged perspective view of a rotatable blade, according to the present invention;

FIG. 10 is an end view of the rotatable blade seen in FIG. 9; and

FIG. 11 diagrammatically shows root development of a tree seedling planted in a soilbed prepared according to the present invention.

DETAILED DESCRIPTION

Figure 1:
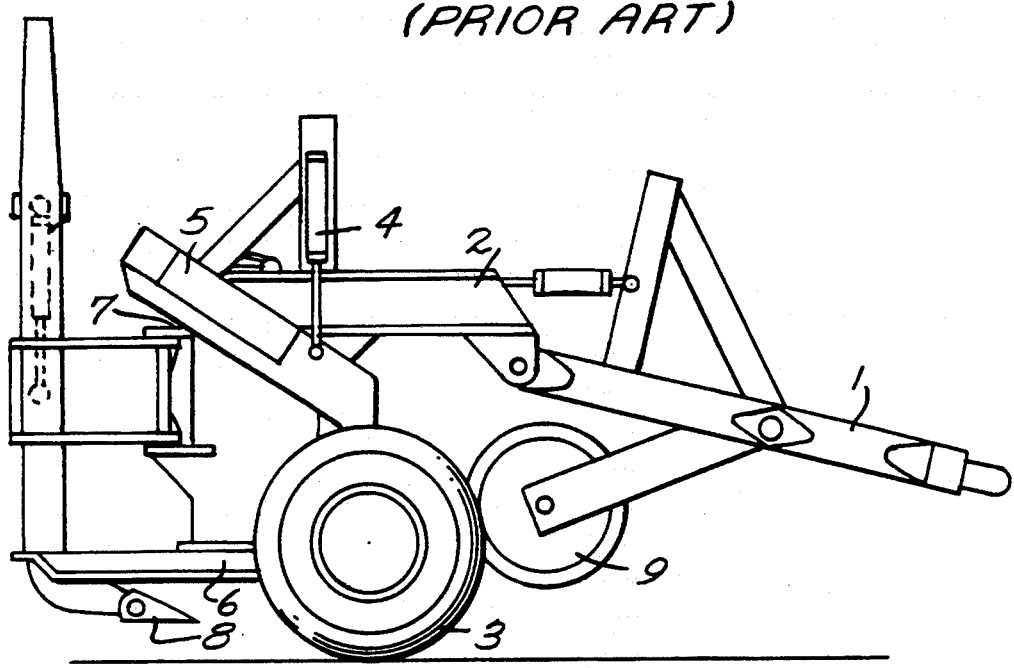
FIG. 1 is a side view of a known apparatus for breaking up a subsurface hardpan stratum.
Figure 2:
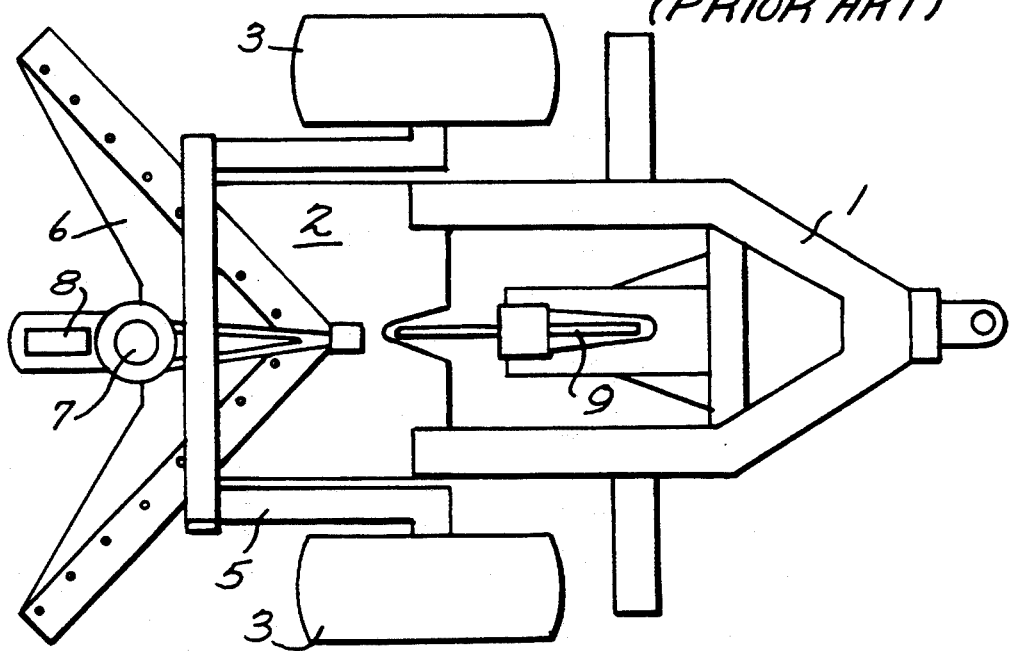
FIG. 2 is a top plan view of the apparatus shown in FIG. 1.

Turning attention first to FIG. 3, the present invention is shown as being attached to the rear of a bulldozer-type vehicle 38. However, it could also be attached to a variety of other types of powered equipment, including tractors and the like, it only being essential that the present invention be moved along in engagement with the ground to be cultivated. The ground to be cultivated is a soilbed 20, comprised of a subsurface hardpan stratum 20a and a topsoil stratum 20b.

The apparatus according to the present invention is generally indicated at 10 and is comprised of a frame 12 provided with a generally pointed subsoiling tine 14 for fracturing the soilbed 20 and particularly for breaking up the subsurface hardpan stratum 20a. The subsoiling tine 14 is fixedly attached to a mounting member, such as mounting post 16, which is fixed to frame 12 and rigidly held in a substantially vertical position with respect to the local ground surface. The mounting post 16, with subsoiling tine 14 thereon, can be raised or lowered to a suitable vertical position by any suitable moving mechanism, including, for example, a hydraulic lift 18 designed to move frame 12. This allows proper positioning of the subsoiling tine 14 to allow it to pierce the soilbed 20 to a sufficient depth to break up or fracture the hardpan stratum 20a. The subsoiling tine 14 is angled forward in the direction of travel to facilitate its movement through the hardpan stratum 20a. Such an angle, indicated as "a" in FIG. 3 for convenience, may, for example, range between about 34° and about 43°. A range of about 37° to 38° is preferred for operation in most soil conditions.

An additional blade structure 22 (also shown in FIGS. 4a and 4b) is mounted by bolts 15 to the mounting post 16 so that it is positioned above the subsoiling tine 14. This is best shown in FIG. 4a. Blade structure 22 modifies the shape of the plowed area or fracture zone formed by tine 14 to create the desired v-shaped, trench-like path, shown generally at 24 in FIGS. 6 and 8. This path is substantially wider at its top (i.e., near the soil surface) than at its bottom, and tapers inwardly from its top to bottom. The depth of the path 24 generally corresponds to the operative penetration depth of subsoiling tine 14. Typically, the width at the top of the fracture zone is about twice the operative penetration depth of the subsoiling tine 14, shown in FIGS. 6 and 8. A flattened, triangular shape for the blade structure 22 is preferred, especially when one point of the triangle is positioned to intersect mounting post 16, with the other two points extending outwardly to either side of the mounting post 16. It should be noted, however, that other shapes for blade structure 22 could also be effectively employed. Blade structure 22 is typically attached to the mounting post 16 such that it lies in a plane which is substantially perpendicular to mounting post 16 or is parallel to the horizontal.

It is an additional goal of the present invention to loosen the topsoil stratum 20b, then move a portion of the topsoil into the trench-like path 24 created by the tine 14 and blade 22 to create a mound therealong, as shown, for example, in FIG. 6. The combined action of tine 14 and blade 22 initially loosens, but does not significantly displace the topsoil stratum 20b adjacent the edges of the trench-like path 24 along the fracture zone. To realize the desired manipulation of the topsoil stratum 20b, at least one pair of rotatable blades 26,28 are provided to the rear and to either side of the tine 14, relative to the direction of operational travel. Blades 26,28 are rotatably mounted on corresponding jump arms 26a,28a, as seen in FIGS. 5 and 7, by a sealed bearing hub assembly 29.

Blades 26,28 are generally bowl-shaped with convex and concave faces. The concave face is generally the inwardly and also slightly forwardly directed face, as seen in FIGS. 5 and 7. The difference in the forward versus inward facing orientation of the blades 26,28 will depend on the exact angular relationship between the blades 26,28 and the jump arms 26a,28a.

As shown in FIG. 5, in a given pair of blades 26,28, blade 26 is disposed forward of blade 28 so that a trailing edge of the forward blade 26 generally is located directly across from the center of the rearward blade 28 of the pair. Thus, the trailing edge of the forward blade 26 and the center of the rearward blade 28 generally lie on a line which is substantially perpendicular to the direction of operational travel of the apparatus. The position of the blades 26, 28 could be reversed so that blade 28 is instead forward of blade 26.

A peripheral edge of each blade 26,28 may be beneficially scalloped or otherwise notched, as indicated at 31 in FIGS. 5, 7, 9, and 10.

Each jump arm 26a,28a is pivotally attached to a corresponding relief mechanism for adjustably and progressively pressing blades 26,28 against the ground in order to perform their loosening, displacing and mounding action. Each jump arm 26a,28a can be manually set and locked in a desired position to maintain a particular penetrating depth for the blade 26,28. In the alternative, the movement and orientation of each jump arms 26a,28a can be controlled by the action of a corresponding control mechanism, such as, for example, a pressurized piston 48 assembly, as shown in FIG. 3. Each piston assembly 48 is connected to a respective jump arm by a pivot plate 52. A pressurized piston assembly 48 (or other chosen mechanism) and its connection with the upper end of a corresponding jump arm is typically contained in a housing 27 mounted on frame 12.

The pressurized piston assembly 48 is adjusted so that in an instance when a blade 26 or 28 encounters a significant obstacle, the corresponding jump arm 26a or 28a is forced by the obstacle to pivot upwardly against a predetermined amount of urging force exerted by the piston assembly 48 operating through pivot plate 52, as seen in phantom in FIG. 3 by the dashed outline showing blade 28 in an upwardly moved position, while the blade 26 or 28 simply rolls over the obstacle. Once an obstacle is passed over, the urging force provided by the piston assembly 48 forces the blade downwards into an operative, soil-penetrating position.

The provision of a piston assembly 48 or the like reduces the likelihood that the blades 26,28 will become insurmountably obstructed by an obstacle, therefore requiring inconvenient manual removal of the obstacle and inefficient stop-start operation of the apparatus.

The predetermined amount of urging force exerted by the piston assembly 48 (or other chosen mechanism) is selected as a compromise between a force required for maintaining a certain operative penetration depth for the blades 26 and 28, and the force determined to permit the blades 26 and 28 to assuredly traverse obstacles to minimize inefficient stop-start action to clear the area in front of the blades.

The blades 26,28 are ideally positioned so that they penetrate only as deeply as the depth of the local topsoil stratum 20b. This ensures that substantially only nutrient-rich topsoil is loosened and then moved into the trench-like path 24. The blades 26,28 passively rotate as they pass over the ground in operation.

It has been discovered that blades 26,28 should be oriented or angled to most effectively function. With reference to FIGS. 9 and 10, the blades 26,28 may be angled with the respect to an operational direction of travel. To accomplish this, a forward edge of a given blade points outwardly while a rearward edge of the blade points inwardly. In this orientation, a plane 33 defined by the outer notched periphery of the blade lies at an angle $\beta$ with respect to a plane 35 containing a line of operational travel of the apparatus. The angle $\beta$ thus formed may beneficially range between about 20° to about 26°, with about 23° being most ideal.

Each blade 26,28 is also undercut or tilted away from the vertical such that a lower edge of the blade extends forward through the vertical, as shown in FIG. 10, and also towards the subsoiling tine 14. Simultaneously, the upper edge is moved from the vertical in an opposite direction, and likewise, away from the subsoiling tine 14. This angle of undercut e may range, for example, from about 0° to about 9° from vertical, with about 7° to about 8° being most ideal. The undercut or tilt angle may be somewhat higher, but use of larger undercut angles entails a risk that the relief mechanism discussed above may not function effectively, thereby increasing the likelihood of fouling. The magnitude of the undercut angle shown in the figures is somewhat exaggerated for illustrative purposes.

Each blade 26, 28 is typically about 36 inches in diameter and is constructed from steel or other suitably hard material. Therefore, taking into account the angle $\alpha$ of the blades (which was ideally about 23° as discussed above), the rearward blade 28 trails the forward blade 26 of the pair by a distance A in FIG. 5 of about 16 inches, measured on a line parallel to an operative direction of travel of the apparatus.

Collectively, tine 14 and blade 22 first form a generally v-shaped trench-like path 24, thereby pushing soil which is displaced towards the edges of the path. Blades 26,28 are lowered so that they penetrate the topsoil stratum 20b to a predetermined depth. As the whole assembly is moved, blades 26,28 move through the topsoil stratum 20b and will passively rotate at a rate proportional to forward movement. As blades 26 and 28 move forward and rotate, they lift up portions of the nutrient-rich topsoil from the region adjacent the edges of the trench-like path 24. Blades 26 and 28 are transversely displaced with respect to the subsoiling tine 14 and blade structure 22. This transverse spacing is indicated at B1 and B2 in FIG. 5 at a distance, respectively, that is typically about 16 inches for each, measured from the line of action of the subsoiling tine 6 to the trailing edges of the rotatable blades 26,28.

The forwardmost blade 26 of a given pair cuts into the topsoil stratum 20b. The displaced topsoil generally follows the concave face of the blade 26 from a lower portion to an upper portion until it falls forward under gravity and with some forward momentum provided by the forward moving assembly. The topsoil is also inverted as it falls. Then, by virtue of the angle $\beta$ of each blade with respect to the line of travel of the apparatus, the inverted topsoil is pushed toward and into the trench-like path 24 formed by tine 14 and blade 22. The rearwardmost blade 28 operates in a corresponding fashion, but it moves inverted topsoil on top of that moved into the trench-like path 24 by the forward blade 26. This achieves the mounding of the nutrient-rich topsoil within the trench-like path 24. As can be seen from FIGS. 6 and 8, a relatively well-defined mound 34a, 34b of nutrient-rich topsoil is created within the trench-like path 24, with at least a portion extending to the bottom of the trench.

More than one pair of rotatable blades can be utilized. For example, two pairs of blades 26,28 and 30, 32 are shown in FIG. 7. Each additional pair of blades is mounted outside of and rearwardly of a previous pair of blades. When more than one pair of blades is used, the resultant width of the mounded topsoil increases as shown by comparing the results in FIG. 6 with that in FIG. 8. Each additional pair of blades is also mounted as discussed above so that one blade of the additional pair is forward of the second blade. Each additional pair of blades is also oriented and tilted as discussed above.

A plow blade or bulldozer blade 36 for clearing large debris like stumps or large rocks may be mounted on a forward end of the vehicle 38 used to operate the apparatus according to the present invention, as is depicted in FIG. 3. The plow blade 36 may be further provided with a plurality of raking tines 40 on a lower edge of the plow blade 36. Such raking tines 40 further ensure that the path immediately in front of the vehicle 38 is substantially clear of debris which might interfere with the operation of the apparatus. The blade 36 may be raised and lowered as desired by lift mechanism 50. The lift mechanism 50 is typically hydraulically operated.

In conditions where a great deal of matted or tangled surface roots or fibrous vegetation is present, especially where forest land has been cut over, a coulter disk 42 may be provided immediately in front of tine 14. The coulter disk 42 acts to cut or break up such matted material to help reduce tangling of such matted material about the subsoiling tine 14.

In operation, the present invention is first attached at a rearward end of a vehicle 38, such as a tractor, as discussed above. Then, the subsoiling tine 14 is lowered to an appropriate depth to pierce the hardpan stratum 20a. As the tractor 38 moves forward, coulter disk 42, subsoiling tine 14, blade 22, and blades 26,28 each engage the hardpan and topsoil strata. Tine 14 will at least partially penetrate the subsurface hardpan stratum 20a to thereby fracture the hardpan and create a trench-like path 24 along the path of operation of tine 14. Following the action of tine 14 to establish the fracture zone, with the trench-like path 24 therein, the nutrient-rich topsoil stratum 20b adjacent the edges of path 24 is loosened and broken up by blades 26, 28. The topsoil is then inverted, then moved or pushed into the trench-like path 24 to form a mound 34a,34b extending along the length of the trench 24. The final result, shown in FIGS. 6 and 8, is a well-defined planting region of topsoil having superior ability to support plant growth.

In addition to FIGS. 6 and 8, FIG. 11 depicts a seven month old pine seedling 46a and its root system 46b as it developed in a soilbed prepared according to the present invention. It has been found that the defined zone of nutrient-rich topsoil, established by the present invention, presents a deep and hospitable environment that allows root system growth that is extraordinarily enhanced and essentially accelerated. For a seedling in a conventional soil system, comparable root development would only be expected after ten or more years, and comparable tree size would be expected after three or more years. It should be emphasized that the seven month development of the seedling, diagrammatically shown in FIG. 11, is within one typical-length growing season in most regions of the world. Many types of trees and plants which can be row planted can likewise benefit from the above-described method and apparatus. The enhanced development of plants grown a growing environment according to the present invention has direct financial benefits in that trees and plants reach maturity faster to thereby yield timber, fruits, grapes, nuts, etc.

Another advantage of the present invention is that mounded topsoil, which is worked as described above, promotes an optimal level of moisture retention, thus making it ideal for both high and low rainfall areas. As seen in FIGS. 6 and 8, sub-trenches 44 are formed to either side of the mounded topsoil by the action of the rotatable blades 26,28. These lateral subtrenches 44 beneficially act as moisture banks for the soil system according to the present invention. In comparatively dry conditions, available moisture concentrates in these subtrenches 44 and is beneficially dispersed through the fractured soil. In comparatively wet conditions, the subtrenches 44 act to drain off excess moisture and thereby maintain an optimal moisture level in the soil. With respect to this latter characteristic, when the soil system according to the present invention is established on hilly land, the subtrenches 44 act to control moisture flow down the hillside and thereby help reduce soil erosion.

Previously, several different machines were used to accomplish a result comparable to that of the present invention, requiring several passes to complete the task. For example, when using the apparatus disclosed in Applicant's previously issued U.S. Pat. No. 4,815,545, the trench-like path formed is only about one-half as wide at the soil surface compared to the depth of the path, thereby necessitating repeated passes. Not surprisingly, the results were varied, and optimal and consistent results were difficult, if not impossible, to achieve. In general, the present invention allows one to subsoil, fracture the hardpan stratum, and invert and mound topsoil in a single pass operation with a great deal of control over the placement of the nutrient-rich topsoil to create an optimal zone or region for plant growth.

While the present invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus to produce an improved planting bed in soil having a subsurface hardpan stratum and a surface topsoil stratum, comprising:
   (a) a frame;
   (b) means attached to said frame for creating a fracture zone in said subsurface hardpan stratum and said topsoil stratum, wherein said fracturing means operates to form an elongated trench having a predetermined depth in said fracture zone; and
   (c) at least two pairs of rotatable blades mounted rearwardly on said frame and spaced transversely apart from said fracturing means for breaking up said topsoil stratum and mounding topsoil in said elongated trench, wherein each blade of each pair of blades is parallel to the other blade of said pair.

2. An apparatus as set forth in claim 1, wherein said means for creating a fracture zone in subsurface hardpan soil comprises a support shaft having a generally pointed subsoiling tine mounted on a first end thereof, said support shaft being attached to said frame at a second end opposite said first end.

3. An apparatus as set forth in claim 2, wherein said means for creating a fracture zone in subsurface hardpan soil further includes a blade attached to said subsoiling tine which is disposed in a plane substantially parallel to the surface of the earth, said blade extending to either side of said subsoiling tine such that said fracture zone is wider than that which would be formed without said blade.

4. An apparatus as set forth in claim 1, wherein each said rotatable blade is pivotably mounted on said frame.

5. An apparatus as set forth in claim 1, wherein each said rotatable blade has a first concave surface and a second convex surface.

6. An apparatus as set forth in claim 1, wherein each said rotatable blade has notches about a periphery thereof.

7. An apparatus as claimed in claim 1, wherein a first blade of each said pair of rotatable blades is disposed forward of a second blade of said pair, relative to an operative direction of travel.

8. An apparatus as claimed in claim 7, wherein a trailing edge of said first blade and a center of said second blade substantially lie on a line which is substantially perpendicular to an operative direction of travel.

9. An apparatus as set forth in claim 1, wherein said frame is mounted on a powered vehicle.

10. An apparatus as set forth in claim 9, wherein said frame is rearwardly mounted on said powered vehicle.

11. An apparatus as set forth in claim 9, wherein means for clearing debris from the path of said motor vehicle is mounted on a forward end of said powered vehicle.

12. An apparatus as set forth in claim 11, wherein said means for clearing debris further includes a plurality of spaced apart projections which extend a predetermined distance therefrom beneath the surface of the ground.

13. An apparatus as set forth in claim 11, wherein said means for clearing debris is a bulldozer blade.

14. An apparatus as set forth in claim 1, further comprising cutting means for breaking up roots and matted debris, said cutting means being disposed proximate to and substantially in front of said means for creating a fracture zone, with respect to a operative direction of travel.

15. A method of preparing a soilbed having a subsurface hardpan stratum and a surface topsoil stratum, in order to provide an improved planting medium for plants having root systems, comprising the steps of:
   (a) forming an elongated trench of a predetermined depth in the soil which extends in depth through said topsoil stratum and at least partway into said hardpan stratum, thereby fracturing said hardpan stratum;
   (b) lifting and inverting topsoil from said topsoil stratum along said elongated trench; and
   (c) mounding said lifted and inverted topsoil in said elongated trench.

16. A method as set forth in claim 15, including the step of forming an elongated trench having a width near the surface of the soil which is greater than said predetermined depth of said trench.

17. A method as set forth in claim 15, including the step of mounding topsoil along said trench such that the height of the topsoil thus mounded is as great as a depth of said elongated trench.

18. A method as set forth in claim 15, further comprising the step of clearing debris from an area where said elongated trench is to be formed, prior to said step of forming said trench.

19. A method as set forth in claim 18, further including a step of breaking up matted roots and debris from the region where said elongated trench is to be formed, prior to said step of forming said trench.

20. An apparatus to produce an improved planting bed in soil having a subsurface hardpan stratum and a surface topsoil stratum, comprising:
   (a) a frame;
   (b) means attached to said frame for creating a fracture zone in said subsurface hardpan stratum and said topsoil stratum, wherein said fracturing means operates to form an elongated trench having a predetermined depth in said fracture zone; and
   (c) at least one transversely spaced pair of rotatable blades mounted rearwardly on said frame and spaced transversely apart from said fracturing means for breaking up said topsoil stratum and mounding topsoil in said elongated trench, wherein a trailing edge of one blade and a center of the other blade substantially lie on a line which is substantially perpendicular to an operative direction of travel.

21. An apparatus as set forth in claim 20, wherein said means for creating a fracture zone in subsurface hardpan soil comprises a support shaft having a generally pointed tine mounted on a first end thereof, said support shaft being attached to said frame at a second end opposite said first end.

22. An apparatus as set forth in claim 20, wherein said means for creating a fracture zone in subsurface hardpan soil further includes a blade attachment which is disposed in a plane substantially parallel to the surface of the earth, said blade attachment extending to either side of subsoiling tine such that said fracture zone is wider than that which would be formed without the blade attachment.

23. An apparatus as set forth in claim 20, wherein each said rotatable blade is disposed at an angle to an operative direction of travel of the apparatus.

24. An apparatus as set forth in claim 20, wherein at least two pairs of rotatable blades are used, such that the rotatable blades on each side of said means for creating a fracture zone are parallel to one another.

25. An apparatus as set forth in claim 20, wherein each said rotatable blade is pivotably mounted on said frame.

26. An apparatus as set forth in claim 20, wherein each said rotatable blade has a first concave surface and a second convex surface.

27. An apparatus as set forth in claim 20, wherein each said rotatable blade has notches about a periphery thereof.

28. An apparatus as set forth in claim 20, wherein said frame is mounted on a powered vehicle.

29. An apparatus as set forth in claim 28, wherein said frame is rearwardly mounted on said powered vehicle.

30. An apparatus as set forth in claim 28, wherein means for clearing debris from the path of said motor vehicle is mounted on a forward end of said powered vehicle.

31. An apparatus as set forth in claim 30, wherein said means for clearing debris further includes a plurality of spaced apart projections which extend a predetermined distance therefrom beneath the surface of the ground.

32. An apparatus as set forth in claim 30, wherein said means for clearing debris is a bulldozer blade.

33. An apparatus as set forth in claim 20, further comprising cutting means for breaking up roots and matted debris, said cutting means being disposed proximate to and substantially in front of said means for creating a fracture zone, with respect to a operative direction of travel.

* * * * *